Nov. 28, 1933.  J. F. TOWNSEND  1,936,808
BALL TRIMMING MACHINE
Filed Oct. 15, 1929
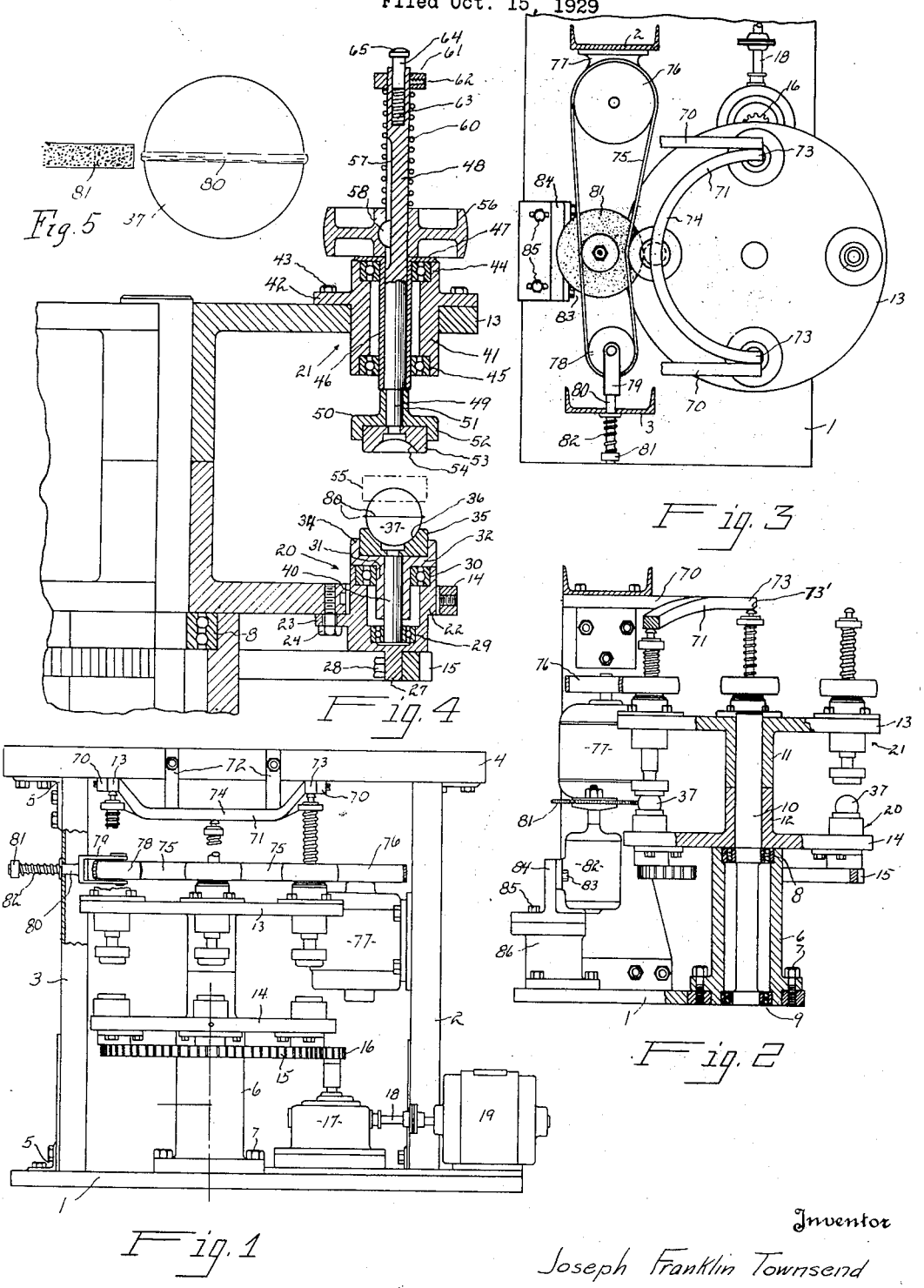
Inventor
Joseph Franklin Townsend
By Slough and Canfield
Attorney Patented Nov. 28, 1933

1,936,808

UNITED STATES PATENT OFFICE 1,936,808

BALL TRIMMING MACHINE

Joseph Franklin Townsend, Elyria, Ohio, assignor to Worthington Ball Company, Elyria, Ohio, a corporation of Ohio Application October 15, 1929. Serial No. 399,814

8 Claims. (Cl. 51—108)

This invention relates to multiple unit machine tools.

While my invention may be embodied in various forms, I have chosen to illustrate and describe it in connection with a machine of the multiple work spindle turret type in which the work is mounted on a revolving head or turret to bring it into position for engagement with the tool and in which the work is rotated during the operation thereon by the tool.

One of the applications of my invention is to perform the operation of removing from articles such as golf balls or other balls a fin or other irregularity formed on the ball by a preceding operation.

Another object of my invention is to provide a machine for performing the said operation on a golf ball or other ball by means of an abrading tool.

Another object is to provide a machine of this class in which the abrading tool is a rapidly rotating abrasive wheel.

Another object is to provide a machine of this class into which the balls to be operated on may be fed by an operator at a station, and which will thereafter automatically perform said operation on the balls and return them to the operator at the station where they may be removed by the operator.

Another object is to provide, in a machine of the type having a revolving work turret, an improved chuck device for receiving and gripping the work to be operated on and for rotating the work during the operation thereon.

Another object is to provide, in a machine of the type having a revolving work turret, a rotatable work holding device which may be non-rotative at the operator's station to facilitate his putting the work therein and removing the work therefrom, and means for automatically rotating the work holding device during operation upon the work.

Another object is to provide in a machine of the type having a revolving turret and a plurality of rotatable spindles thereon, means for causing the spindles to move with the turret through a part of its revolution without rotating on the turret and causing them automatically to be rotated through the rest of the revolution of the turret.

Another object is to provide in a machine of the class described an improved work holding device for such articles as golf balls or other balls provided with a receptacle in which the article may be simply placed by the operator with means working automatically thereafter to grip the article in the receptacle, rotate it for operation thereon by a tool, and after operation thereon permitting the operator to remove the article from the machine by simply removing it from the receptacle.

Another object is to provide in a machine having a revolving work turret an improved work holding device or work spindle construction provided with a work receptacle rotatable on the turret, in which receptacle the operator may seat a work piece, the machine having automatic means for subsequently gripping or otherwise securing the work in the receptacle and thereafter rotating the receptacle and work for operation thereon by a tool, and after operation by the tool stopping the rotation of the receptacle and releasing the work piece, these events occurring during the rotation of the turret.

Other objects will be apparent to those skilled in the art to which this invention pertains.

My invention is fully disclosed in the following description taken in connection with the accompanying drawing, in which:—

Fig. 1 is a front elevational view of a machine embodying my invention with some of the parts broken away for clearness;

Fig. 2 is a side sectional view of the machine of Fig. 1 taken approximately from the plane 2 of Fig. 1;

Fig. 3 is a plan view of the machine of Figs. 1 and 2 with parts omitted for simplicity;

Fig. 4 is an enlarged view showing in cross-section a work holding and rotating spindle and chuck construction which I may employ;

Fig. 5 is a diagrammatic view of a golf ball or other ball showing the positional relation thereof, when mounted in the machine of my invention, to an abrasive wheel tool which I may employ.

Referring to the drawing, I have shown at 1 a main base from which rise two side frames 2 and 3, across the upper end of which is a head 4. The head, side frames and base may be rigidly secured together in any suitable manner as for example by angle irons 5, 5. The frames 2 and 3 and head 4 in the illustrated embodiment of my invention are made from channel iron, but this is not essential.

Rising from the base 1 is a tubular column 6 bolted to the base as at 7. In the upper and lower ends of the column 6 are ball bearings 8 and 9 for rotatably supporting and guiding a vertical stem 10. The stem 10 extends upwardly out of the column 6 and rigidly secured thereto, as by sleeves 11 and 12, is a circular head 13 and a circular lower head 14 coaxial with the stem 10, vertically spaced apart.

The stem and heads thus provided are adapted to be rotated in the bearings 8 and 9 by means of a ring gear 15 connected to the lower side of the head 14 and coaxial therewith, and by a driving pinion 16 meshed with the gear 15, and adapted to be driven through a reduction gearing transmission concealed in the housing 17 mounted on the base 1 of the machine through which transmission power is transmitted to the pinion 16 by a shaft 18 driven by an electric or other motor 19 on the base 1. Thus, the stem 10 and heads 13 and 14 are adapted to be revolved around the axis of the stem 10 at a relatively slow rate.

The head 14 is provided with a plurality, four being shown, of lower chuck elements shown generally at 20 and the upper head 13 is provided with a corresponding number of upper chuck elements shown generally at 21, one of each of the chuck elements being shown in enlarged cross-section in Fig. 4.

The lower chuck elements 20 each consist of a base 22 of upwardly open cup shape having an external flange 23 by which it is bolted as at 24 to the lower side of the head 14. The external bottom of each cup is provided with a projection 27 and it is upon the several projections 27 that the ring gear 15 is secured as by bolts 28 to give it driving connection with the head 14.

Within the cup 28 in the bottom thereof is a ball bearing 29 and in the upper open end of the cup is a ball bearing 30, the two ball bearings being aligned on a vertical axis. Extending downwardly through the ball bearing 30 is the cylindrical body 31 of a receptacle support; the receptacle support besides the body 31 comprises a head portion 32 extending transversely of the open end of the cup 22 and entirely covering the same to close the cup and seal the ball bearings 30 and 29 in the cup.

The body portion 32 has a peripheral vertically disposed annular flange 34 thereon, within which is fitted a receptacle 35 in the form of a block having a horizontal upper face or surface in which is provided a depression 36 of such size and shape that an article to be operated upon by the machine, such for example as a golf ball 37, may be seated in the depression 36 and centered therein coaxial with the ball bearings 29 and 30.

Mounted in the ball bearing 29 and extending vertically through a bore in the body 31 is a shaft 40. By this construction, the receptacle 35 and the associated parts may rotate on the axis of the ball bearings being guided by the shaft 40 in the bearing 29 and the body 31 in the bearing 30.

The upper chuck element 21 comprises a hollow cylindrical body 41 having an external flange 42 by which it is bolted as at 43 to the upper face of the head 13 in axial alignment with the axis of the lower chuck element above referred to. Ball bearings 44 and 45 are provided respectively in the upper and lower ends of the body 41 and coaxial therewith. A sleeve 46 extends downwardly through both ball bearings and is supported on its upper end by a disk shaped head 47.

Extending vertically through the sleeve 46 is a shaft 48 the lower end portion 49 of which, extending out of the sleeve 46, is of reduced diameter and has mounted thereon a clamp support 50 comprising a shank 51 bored out and pressed onto the reduced portion 49 of the shaft and a head 52 of flat downwardly open cup form, into the open end of which is pressed a clamp element 53 in the form of a block having in its lower portion a depression 54 conforming generally to the shape of the article 37 supported in the receptacle 35.

In the operation of the device, the clamp 53 is adapted to be moved downwardly to engage the article 37 by the depression 54 and to press the article between the clamp 53 and receptacle 35 to securely grip it therebetween, the lowermost position of the clamp being indicated as at 55 in broken lines in Fig. 4.

Upon the shaft 48 and above the head 47 is mounted a belt pulley or wheel 56. The upper part of the wheel is mounted on the head 47 and is splined to the shaft 48 by means of a spline 57 in the shaft and a key 58 in the wheel. Thus, when the wheel 56 is turned on the axis of the shaft 48, in a manner to be described, the shaft will be turned thereby, and if at this time the article 37 is gripped between the clamp element 53 and receptacle 35, the article 37 will be rotated and rotate with it the receptacle 35. Thus, the article 37 may be rotated on the axis of the bearings 29 and 30.

Normally, the clamp 53 is held in its elevated position shown in Fig. 4 by means of a spring 60 abutting at one end upon the hub of the wheel 56 and at its other end abutting upon a collar 61 secured to the shaft 48 by a set screw 62, thus exerting upward thrust upon the shaft 48 which is normally absorbed by the shank 51 of the clamp support 50 engaging the lower end of the sleeve 46. The upper end of the shaft 48 is bored out axially and in the bore is placed a compression spring 63 and resting on the spring in the bore is a vertically slidable pin 64 having a rounded head 65, the purpose for which will now be described.

Projecting forwardly from the head 4 and secured thereto in any suitable manner is a pair of cam supports 70—70, to the outer ends of which are secured the free ends of a generally U-shaped cam track 71. The cam track is further connected to the head 4 and rigidly supported thereon by struts 72—72, shown in Fig. 1. The cam track 71 in plan view, Fig. 3, is circular and in front elevational view generally of circular U-shape, as shown in Figs. 1 and 2, and the free ends 73—73 thereof lie in a plane above the middle portion 74 of the U, and the portion 74 preferably continues in a plane for approximately a third of the length of the cam track.

During the revolution of the heads 13 and 14 around their axis, the upper and lower chuck elements 20 and 21 revolve with the heads. The cam track 71 is disposed to lie directly in the path of the axis of the chuck elements. Upon rotation of the heads 13 and 14, the pins 64 of the upper chuck elements come into engagement with the cam track 71, as shown in Fig. 2, the extreme end 73 of the cam track being rounded off to guide the round end 65 of the pin 64 onto the track 71, as at 73'.

Continued rotation of the heads will bring the pins 64 onto the depressed portion 74 of the cam track, and as will be understood from the description of Fig. 4 this will slide the shaft 48 downwardly against the tension of the spring 60 and clamp the article 37 between the clamp element 53 and receptacle 35, the pressure on the article being resilient due to the spring 63. Continued rotation of the heads 13 and 14 will bring the wheel or pulley 56 into driven engagement with a moving continuous belt 75 to be described, and the pulley 56 will thereby be rotated, rotating the shaft 48 and hence the gripped article 37.

The moving belt 75 referred to extends transversely across the rear of the machine, one end passing over the driving pulley 76 of an electric or other motor 77 mounted on the side frame 2 and the other end passing over an idler pulley 150

78 mounted in a fork 79 having a swiveling stem 80 passing outwardly through a perforation in the side frame 3 and provided with a head 81 between which and the frame 3 a compression spring 82 extends surrounding the stem 80 and thus adapted to resiliently hold the idler 78 in the direction to exert resilient tension on the belt 75.

It will thus be seen that in the rotation of the heads 13 and 14, the belt pulleys or wheels 56 successively move into driven engagement with the belt 75 and then move on out of engagement therewith, and are rotated by the belt when in engagement therewith, the full engaged position being shown in Fig. 3, and the spring 82 maintains the belt 75 tight in all engaged positions of the pulley 56 therewith.

The continued rotation of the clutch elements with the gripped article 37 therebetween, as above described, will bring the belt wheel 56 under consideration out of engagement with the belt pulley 75 and the rotation of the chuck elements will stop and finally the pin 64 will move to the elevated portion of the cam track and the spring 60 will retract the clamp element 53 and the article 37 may be removed from the receptacle 35 and another one placed therein by the operator at a convenient station. The action above described of one set of chuck elements is the same for all thereof, four being shown in the drawing.

The operation performed upon the article 37 in the embodiment of my invention illustrated in the drawing is that of removing a fin or the like formed on a golf ball or other ball by a preceding operation. Such a fin is indicated at 80 in Figs. 4 and 5. When the balls are placed successively in the receptacles 35, they are positioned with the fin approximately in a horizontal plane. When the rotation of the chuck elements is effected, as above described, the fin will rotate in the said horizontal plane.

To perform the finishing operation of removing the fin, I provide an abrasive wheel 81 mounted on the shaft of a motor 82, which is adjustably supported by bolts 83 on a bracket 84, the bracket being adjustably secured by bolts 85 to a support 86 on the base 1. By this means, the position of the motor may be changed to bring the working edge of the abrasive wheel 81 into suitable engagement with the ball to remove the fin and to take up wear of the wheel. The abrasive wheel 81 is preferably thin axially and is preferably mounted in a horizontal plane, but this is not essential. Furthermore, the fin on the ball may be removed by a cutting tool in place of the abrasive wheel 81.

The operation of my invention will be understood from the above description thereof. The heads 13 and 14 continuously revolve. An operator at a suitable station continuously takes finished balls out of the receptacles 35 one after the other and places the balls to be operated on therein. The heads 13 and 14 revolve carrying the ball around toward the tool 81 and on the way, the cam followers or pins 64 engage the cam track 61 thereby moving the clamp element 53 downwardly on top of and gripping the ball 37 between the clamp element 53 and receptacle 35. Further rotation of the heads brings the pulleys 56 into engagement with the driving belt 75, thus rotating the ball. Further movement of the ball brings it into engagement with the tool 81, which cuts off the fin. Continued movement of the ball brings it back toward the station and when the cam follower or pin 64 disengages the cam, the spring 60 retracts the clamp element 53 and lifts it from the ball 37 and the ball may be removed.

In Fig. 5 is diagrammatically illustrated a golf ball 37 approximately full size and a portion of the periphery of the abrasive wheel 81, and showing the fin on the ball. In this figure the ball is in a position just before its engagement with the wheel to remove the fin. In the diagrammatic view of the ball, the dimpled, meshed or other well known pattern of the exterior surface of the golf ball has not been indicated for the sake of simplification.

My invention is not limited to the exact details of construction shown and described, but may be embodied in other forms of machines, which will occur to those skilled in the art, and within the scope of my invention. For example, while I have shown and described a rapidly rotating abrasive wheel for cutting away or removing the fin, other types of tool may be employed.

I claim:

1. In a machine of the class described, a rotary head mounted for revolution about a vertical axis, a plurality of work receptacles rotatably mounted on vertical axes on the head, the said axes being spaced from each other and disposed in a circle around said axis of revolution, each receptacle having a portion in which a work piece may rest by gravity, a clamping device associated with each receptacle comprising a clamping element adapted to be moved in the direction of the receptacle axis to clamp a work piece thereon and adapted to be rotated on said axis, means for moving the clamping element to clamp the work piece, said means comprising a cam follower connected to the clamping element, a cam track having a camming surface disposed generally on a cylinder through said circle and disposed at varying distances from said circle, the cam followers being adapted to engage the cam track on revolution of the head during a portion thereof to move the clamp elements axially into engagement with work pieces in the receptacles, means for rotating the work pieces and receptacles during a portion of said revolution of the head, said means comprising an axially stationary wheel associated with each clamping element, a movable element splined to the wheel and adapted to be drivingly engaged by the wheel during a part of the revolution of the head, and a rotary tool mounted on an axis of rotation and means to adjust the tool axis to bring the working portion of the tool into the path of the work pieces while moving with the head during that portion of their revolution in which they are gripped and rotated on the head.

2. In a machine for supporting work pieces for operation thereon by a tool, a head rotatable on a generally vertical axis of revolution, a plurality of work piece receptacles having concave upwardly open sockets therein mounted for rotary movement around substantially parallel generally vertical axes on the head, a work clamping device associated with each receptacle and comprising a body portion coaxially rotatable and vertically reciprocable on the head and provided with a clamping socket disposed above the receptacle, an axially stationary drive pulley splined on the body portion, means for moving the clamping socket toward the receptacle to clamp a work piece between the clamping socket and the receptacle comprising an overhead cam track and a coaxially disposed cam follower on the body portion, a spring for retracting the body portion to retract the clamping socket, and means for rotating the body portion to rotate a clamped work piece during a part of a revolution of the head, said means comprising a continuously moving belt engageable by the pulley in a part of its revolutionary movement, and means for continuously driving the belt.

3. In a machine for supporting work pieces for operation thereon by a tool, a head rotatable on an axis of revolution, a plurality of work piece receptacles mounted for rotary movement around substantially parallel axes on the head, a work clamping device associated with each receptacle and comprising a body portion coaxially rotatable and reciprocable on the head and provided with a clamping socket, an axially stationary drive pulley splined on the body portion, means for moving the clamping socket toward the receptacle to clamp a work piece between the clamping socket and the receptacle comprising a cam track and a coaxially disposed cam follower on the body portion, a spring for retracting the body portion to retract the clamping socket, and means for rotating the body portion to rotate a clamp work piece during a part of a revolution of the head, said means comprising a continuously moving belt engageable by the pulley in a part of its revolutionary movement, and means for continuously driving the belt.

4. In a machine for trimming balls, a head rotatable on a generally vertical axis of revolution, a plurality of ball receptacles having concave upwardly open sockets therein for supporting by gravity balls placed therein with fins to be trimmed disposed in substantially horizontal planes, and the receptacles mounted for rotary movement around substantially parallel generally vertical axes on the head, a ball clamping device associated with each receptacle and comprising a body portion coaxially rotatable and vertically reciprocable on the head and provided with a clamping socket disposed above the receptacle, an axially stationary drive pulley splined on the body portion, means for moving the clamping socket toward the receptacle to clamp a ball between the clamping socket and the receptacle comprising an overhead cam track and a coaxially disposed cam follower on the body portion, a spring for retracting the body portion to retract the clamping socket, and means for rotating the body portion to rotate a clamped ball during a part of a revolution of the head, said means comprising a continuously moving belt engageable by the pulley in a part of its revolutionary movement, and means for continuously driving the belt, and a rotary tool on a stationary rotational axis disposed in the path of the fins of the balls during the revolutionary movement of the head.

5. In a machine for supporting work pieces for operation thereon by a tool, a head rotatable on an axis of revolution, a work piece receptacle mounted for rotary movement on the head, a work clamping device associated with the receptacle and comprising a body portion coaxially rotatable and reciprocable on the head and provided with a clamp, means for moving the clamp toward the receptacle to clamp a work piece therebetween during a part of the revolution of the head comprising a track cam, a cam follower on the body portion, means for rotating the head to move the follower into engagement with and along the cam, resilient means for maintaining the follower in engagement with the cam, resilient means for retracting the body portion and clamp upon movement of the follower from the cam to permit unloading and reloading of work pieces into and from the receptacle and clamp.

6. In a machine for supporting work pieces for operation thereon by a tool, a head rotatable on an axis of revolution, a work piece receptacle mounted for rotary movement on the head, a work clamping device associated with the receptacle and comprising a body portion coaxially rotatable and reciprocable on the head and provided with a clamp, means for moving the clamp toward the receptacle to clamp a work piece therebetween during a part of the revolution of the head comprising a track cam, a cam follower on the body portion, means for rotating the head to move the follower into engagement with and along the cam, resilient means for maintaining the follower in engagement with the cam, resilient means for retracting the body portion and clamp upon movement of the follower from the cam to permit unloading and reloading of work pieces into and from the receptacle and clamp, and means for rotating the body portion during a part of the revolution of the head.

7. In a machine for supporting work pieces for operation thereon by a tool, a head rotatable on an axis of revolution, a work piece receptacle mounted for rotary movement on the head, a work clamping device associated with the receptacle and comprising a body portion coaxially rotatable and reciprocable on the head and provided with a clamp, means for moving the clamp toward the receptacle to clamp a work piece therebetween during a part of the revolution of the head comprising a track cam, a cam follower on the body portion, means for rotating the head to move the follower into engagement with and along the cam, resilient means for maintaining the follower in engagement with the cam, resilient means for retracting the body portion and clamp upon movement of the follower from the cam to permit unloading and reloading of work pieces into and from the receptacle and clamp, and means for rotating the body portion during a part of the revolution of the head to cause the cam follower to rotate and slide on the cam.

8. In a machine for supporting work pieces for operation thereon by a tool, a head rotatable on an axis of revolution, a work piece receptacle mounted for rotary movement on the head, a work clamping device associated with the receptacle and comprising a body portion coaxially rotatable and reciprocable on the head and provided with a clamp, means for moving the clamp toward the receptacle to clamp a work piece therebetween during a part of the revolution of the head comprising a track cam, a cam follower on the body portion, means for rotating the head to move the follower into engagement with and along the cam, resilient means for maintaining the follower in engagement with the cam, resilient means for retracting the body portion and clamp upon movement of the follower from the cam to permit unloading and reloading of work pieces into and from the receptacle and clamp, and means for rotating the body portion during a part of a revolution of the head comprising a pulley splined on the body portion and axially stationary, and means into engagement with which the pulley is moved by revolution of the head.

JOSEPH FRANKLIN TOWNSEND.